Dec. 13, 1960 T. C. BURNETTE, JR 2,963,941
PROJECTING MEANS FOR OPTICAL COMPARATORS
Filed July 18, 1956 6 Sheets-Sheet 2

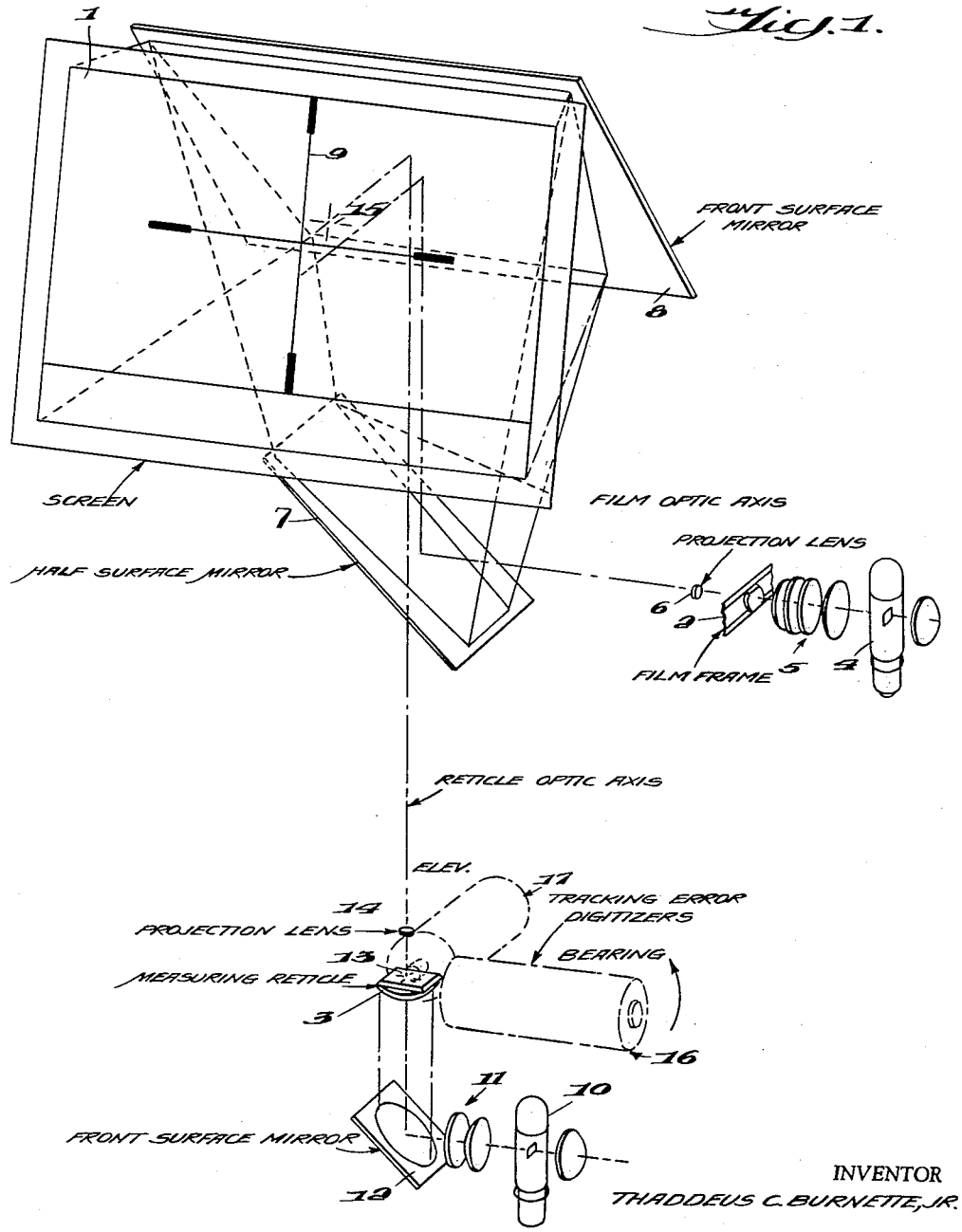

INVENTOR
THADDEUS C.
BURNETTE, JR.
BY Stone, Boyden + Mack,
ATTORNEYS

Dec. 13, 1960 T. C. BURNETTE, JR 2,963,941
PROJECTING MEANS FOR OPTICAL COMPARATORS
Filed July 18, 1956 6 Sheets-Sheet 3
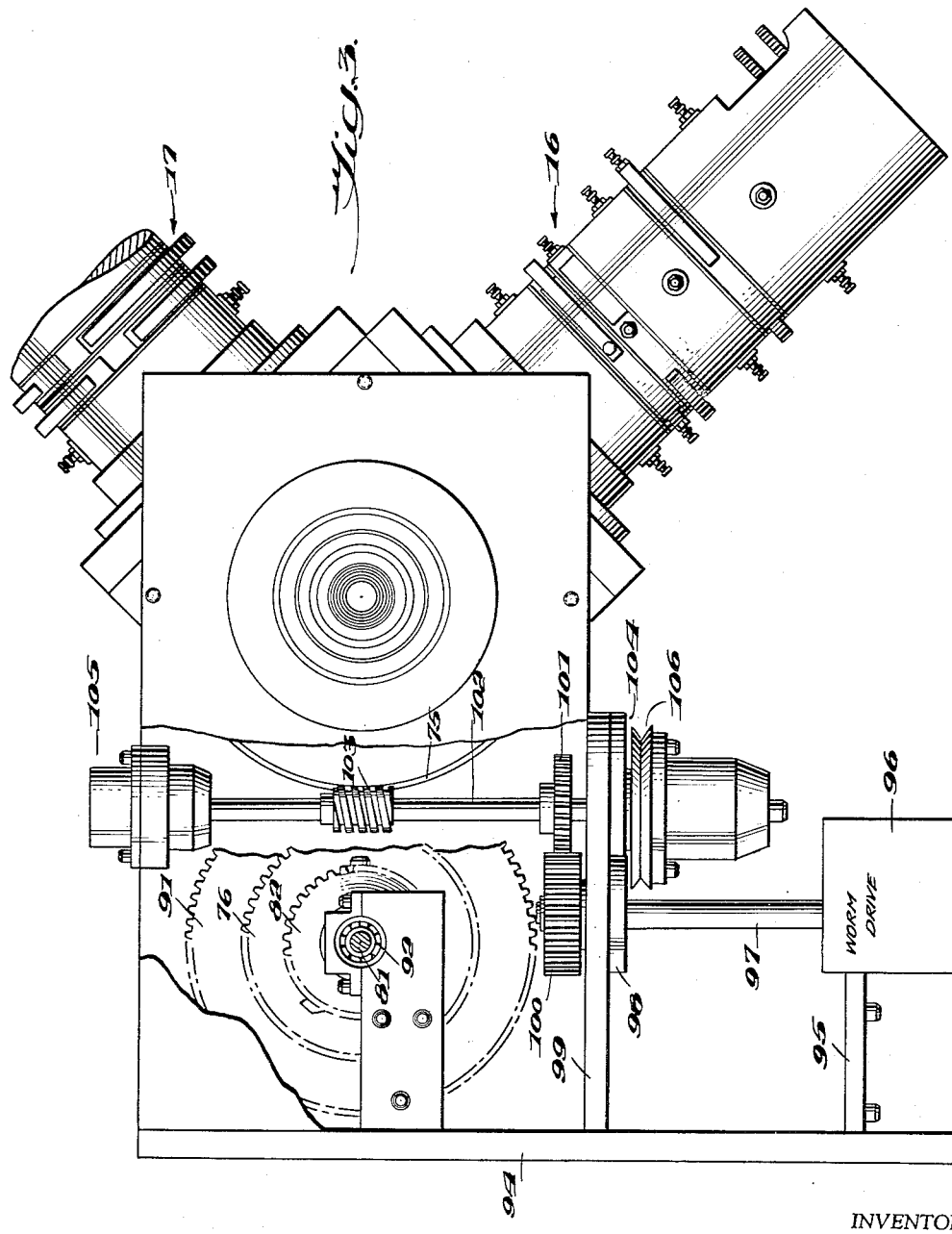
INVENTOR
THADDEUS C. BURNETTE, JR.
BY Stone, Boyden & Mack,
ATTORNEYS Dec. 13, 1960 T. C. BURNETTE, JR 2,963,941
PROJECTING MEANS FOR OPTICAL COMPARATORS
Filed July 18, 1956 6 Sheets-Sheet 4

INVENTOR
THADDEUS C. BURNETTE, JR.

BY Stone, Boyden & Mack,

ATTORNEYS

Dec. 13, 1960 T. C. BURNETTE, JR 2,963,941
PROJECTING MEANS FOR OPTICAL COMPARATORS
Filed July 18, 1956 6 Sheets-Sheet 5
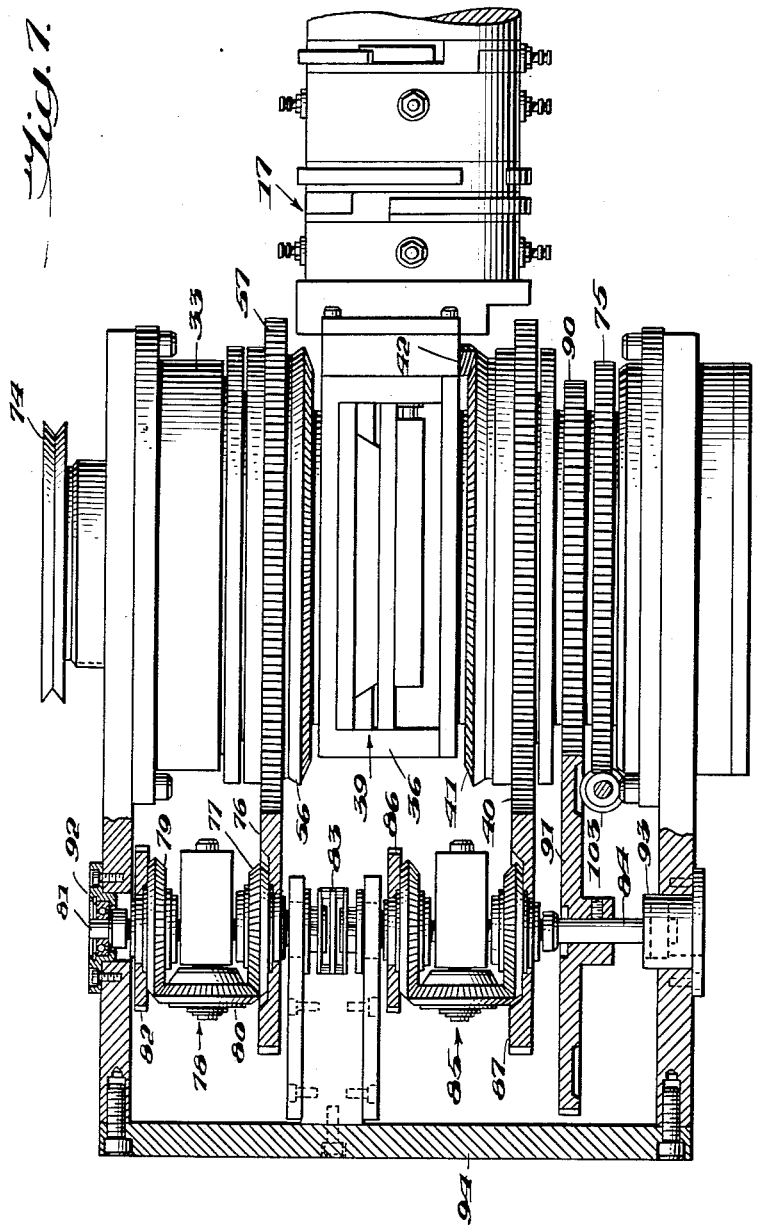
INVENTOR
THADDEUS C. BURNETTE, JR.
BY Stone, Boyden & Mack,
ATTORNEYS

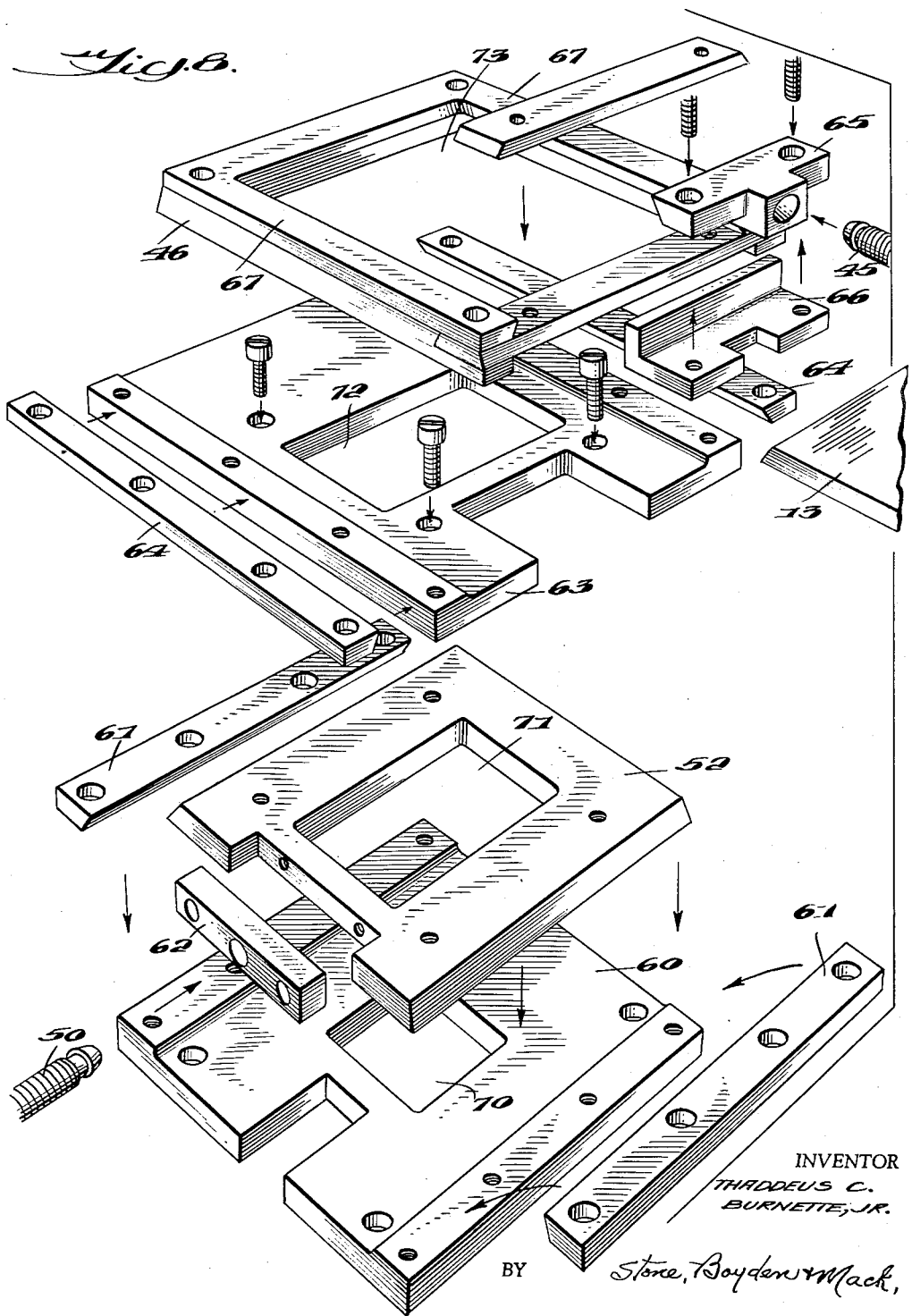

United States Patent Office 2,963,941
Patented Dec. 13, 1960

2,963,941
PROJECTING MEANS FOR OPTICAL COMPARATORS

Thaddeus C. Burnette, Jr., Swannanoa, N.C., assignor to Amcel Propulsion Inc., a corporation of Delaware Filed July 18, 1956, Ser. No. 598,672

7 Claims. (Cl. 88—24)

This invention relates to optical apparatus and broadly to improvements in optical comparators of the type in which both a test image and a reference image are projected on a single screen, the reference image being adjusted to register with the test image. The invention is particularly applicable to film readers for handling film from a photo-theodolite. A particular feature of the invention is the provision of improved means for projecting the reference image, such improved means mounting the reference object for movement in three different directions, provision being made for detecting the extent of movement in two of such directions and for preventing movement of the reference object in said two directions, as well as preventing change in the detecting means, when the reference object is moved in the third direction.

Though the apparatus of the invention is usable wherever the problem of moving a reference object in three directions without coupling between the separate apparatus for each movement occurs, the apparatus is particularly designed for use in conjunction with a film reader for use in examining and correcting data on theodolite film.

A photo-theodolite comprises a camera movable in both bearing and elevation to follow a target, such as an aircraft, cross-hairs which are to be kept in registry with the target, and indicating means for both the bearing and elevation of the camera. The camera takes a motion picture film of the target, together with the cross-hairs and the bearing and elevation indications. When films are simultaneously made by two or more spaced theodolites aimed at the same target, and the films correlated, the exact position of the aircraft in space can be determined at each instant of flight.

One difficulty met with in such use of photo-theodolite films is that the aircraft frequently move at such high speeds that the theodolite operators find it impossible to maintain their cross-hairs directly on the target, so that the data obtained by correlation of the films is inaccurate. The apparatus of the invention is designed to allow for correction of such errors in alignment of the theodolite cameras, during the correlation operation.

A film reader for photo-theodolite film includes a screen on which an image of the theodolite film frame is projected, and the apparatus of the invention includes a reference object in the form of a reticle having a scanning spot, together with means for projecting the reticle on the screen. The film reader operator moves the reticle in $x$ and $y$ directions into registration with a desired point on the target, and means sensitive to such movement detects the spacing between that point on the target and the center of the theodolite cross-hairs, in both bearing and elevation. The detected spacing may then be used to correct the errors in the bearing and elevation readings on the film.

In the above procedure, a problem arises because the theodolite cross-hairs are rotated with respect to the usual $x$ and $y$ directions in accordance with the elevation of the theodolite, at every instant. The reticle must be rotated to a corresponding angle in order that the corrections be accurate, but such rotation must not be allowed to influence the positions of the controls for the $x$ and $y$ positions of the reticle or to change the readings of the detection means. The apparatus of the present invention includes means between the means which rotates the reticle and the means which moves it in $x$ and $y$ direction designed to prevent interrelation between the rotary movement and the other movements of the reticle and also to prevent operation of the detection means when the reticle is rotated.

The apparatus of the invention will now be described in conjunction with drawings of a preferred embodiment of the invention.

In the drawings:

Fig. 1 is a schematic showing of the optical elements of the film reader associated with the apparatus of the invention;

Fig. 3 is a plan view of the reticle and associated mounting and driving means;

Fig. 7 is a side elevational view of the device of Fig. 3, some parts being broken away and shown in section for clarity of illustration, and Fig. 8 is an exploded view of the reticle and cross slide assembly.

Figure 4:
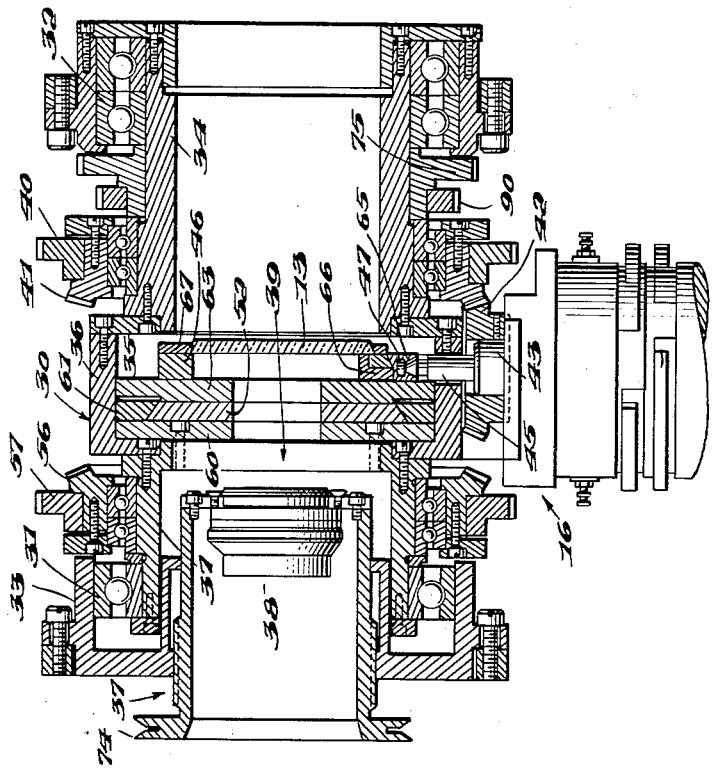
Fig. 4 is a longitudinal sectional view of the rotary housing employed in the device of Fig. 3 and in which certain of the parts of the device are shown in side elevation.

Referring first to Fig. 1, the film reader includes a glass screen 1 on the rear surface of which the images of the film frame 2 and the reticle 3 are projected. A light source 4 projects light through the film through a lens system 5 of conventional design, and the film frame image is directed through a projection lens 6 onto a mirror 7, known as a half surface mirror and whose function will be further explained later. The film frame image is reflected by mirror 7 onto a front surface mirror 8, which reflects the image onto the rear surface of screen 1. As shown on the screen the film frame image includes cross-hairs 9, shown located slightly above the center of the screen.

A light source 10 directs light through a lens system 11 onto a front surface mirror 12 which deflects the light up through the measuring reticle 3 which carries cross-hairs and a scanning dot 13 thereon. The reticle may comprise a silver-surfaced mirror having the indicated portion of the cross-hairs and the scanning dot etched out of the silver surface, so that light corresponding in pattern to the etched portions will pass through the reticle.

The light from the reticle, hereinafter called through the reticle image, passes through a projection lens 14 and onto the side of half surface mirror 7 opposite to the side on which the film frame image is directed. The half surface mirror is a commercially-available type of mirror which has the quality of passing through it a portion of the light energy directed onto one of its surfaces. Therefore, the image of the reticle is projected onto front surface mirror 8 which reflects it onto the rear surface of the screen 1. The reticle image on the screen is shown at 15.

The measuring reticle is capable of movement in *x* and *y* directions in its plane, corresponding to bearing and elevation, and such movement is detected by tracking error digitizers 16 and 17, shown in dashed lines in the figure, and which are coupled to the reticle to sense its movement in bearing and elevation, respectively.

As indicated in Fig. 1, both the film frame image and the reticle image are visible from the front of screen 1, so that the position of the reticle image 15 with respect to the film frame cross-hairs 9 may readily be seen.

Figure 2:
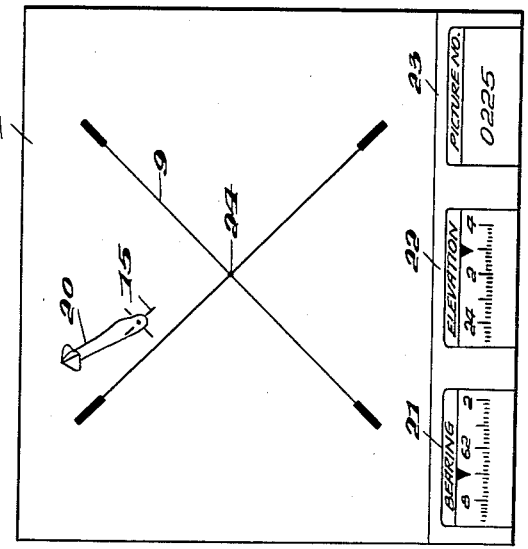
Fig. 2 is a diagrammatic view of the front of the screen of the film reader, showing the projected image of the film frame and the projected image of the reticle.

Referring now to Fig. 2, the film frame image is there shown as including a target 20 in flight, together with the bearing and elevation scales 21 and 22, respectively, of the theodolite at the instant the frame was exposed, and the film identifying information 23 showing the picture number. It will be seen that the film frame image is aligned so that the cross-hairs 9 have their origin in coincidence with an ink dot 24 on the screen, that the cross-hairs are rotated at an angle determined by the elevation of the theodolite at the instant the frame was exposed, and that the cross-hairs are substantially displaced from the target. The bearing and elevation readings on the film frame image are therefore in error. In order to correct this error, the operator moves the reticle image 15 from coincidence with the screen dot 24 to a position such that the scanning dot of the reticle image coincides with a desired point on the image of the target. However, as indicated, the operator must also rotate the reticle image to an extent such that the cross-lines of the reticle are respectively parallel to the cross-hairs 9, as seen in Fig. 2.

Referring next to Fig. 4, the reticle 13 is shown mounted in a housing or drum assembly 30 which is mounted in bearings 31 and 32 so as to be rotatable with respect to an end cap 33 forming part of a base and fixed in position. The housing includes a cylindrical rear barrel 34 which is fixed by cover plate 35 to a cover 36 which carries a cylindrical front barrel 37. The end cap 33 carries a lens mounting assembly 37 which is threadedly engaged in the end cap for rotation to adjust the position of the lens 38 with respect to cover 36 and the reticle movement assembly 39 carried therein.

Rotatably mounted on rear barrel 34 is a gear assembly including a spur gear 40 and a bevel gear 41. The bevel gear meshes with a bevel pinion 42 which is fixed to the shaft 43 of digitizer 16. Through means to be described in conjunction with Fig. 5, rotation of the bevel pinion causes lineal movement of a precision screw 45 which is attached to one of the cross slides 46 of the reticle movement assembly by a cap screw 47.

Figure 5:
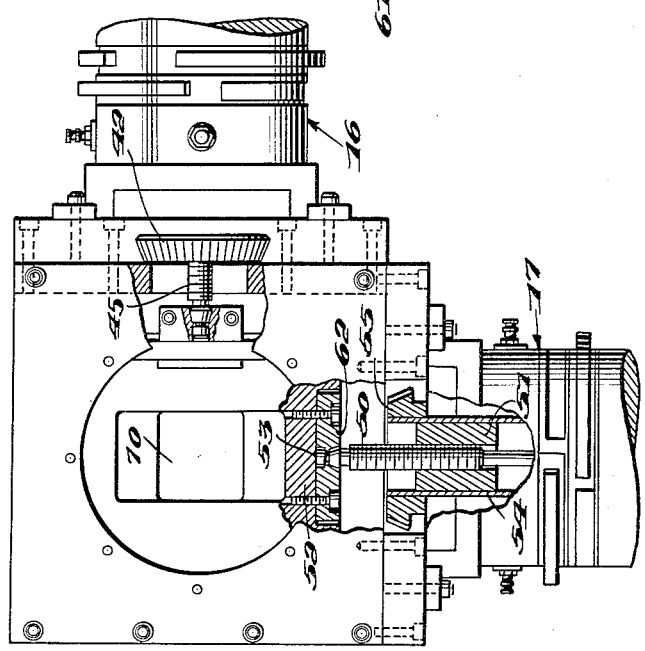
Fig. 5 is a plan elevational view of the central portion of the rotary housing employed in the device of Fig. 1, some parts being broken away for clarity and portions of the digitizing means employed in the device being shown in elevation.

Referring now to Fig. 5, along with Fig. 4, precision screw 45 is identical with another precision screw 50 which is threadedly engaged with a nut 51. Screw 50 drives the other cross slide 52, being fixed thereto by screw 53. The screw and nut of each cross slide driving means may be standard micrometer parts, the screw of which may have, for instance, 50 threads per inch. The nut 51 is mounted in the shaft 54 of digitizer 17 and drives the digitizer shaft when the bevel pinion 55 fixed to the shaft is rotated. Bevel pinion 55 meshes with a bevel gear 56 which, with spur gear 57, forms a gear assembly rotatably mounted on front barrel 37.

Both of the digitizers 16 and 17 may be of the type disclosed in conjunction with Figs. 2 through 7 of my co-pending application Serial Number 598,661, filed July 18, 1956. The digitizer there disclosed is capable of converting rotation of its input shaft into decimal digital notation and provides twenty digits in each stage per rotation of the input shaft, there being three stages of digitation. With a fifty threads per inch micrometer screw driving the digitizer, the digitizer would yield 1000 digits for each lineal inch of screw movement, and hence for each inch of cross slide movement. Of course, it is not necessary that a digitizer of the type disclosed in said application be used, because any apparatus capable of detecting the rotational movement of the nut associated with the precision screw could be used.

Figure 6:
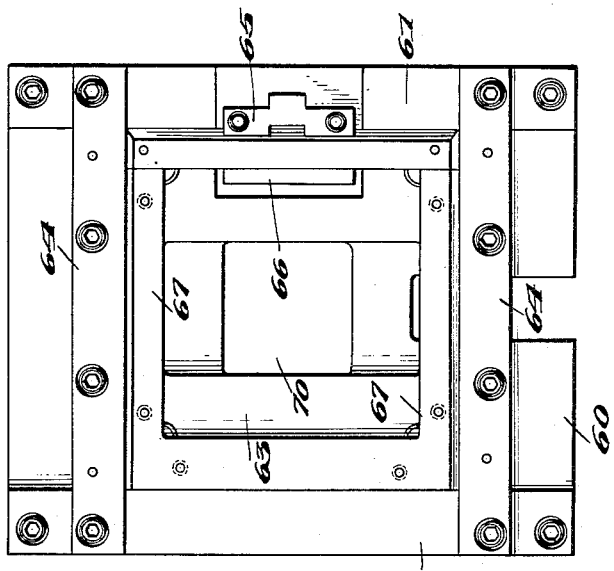
Fig. 6 is a plan view of the reticle and cross slide assembly.

Referring now to Figs. 4, 6, and 8, the reticle movement assembly 39 includes a first slide plate 60 which is bolted to front barrel 37 so as to rotate therewith. The first slide plate carries a pair of bevelled guides 61 at opposite sides of the plate which hold the first cross slide 52 against movement with respect to the slide plate in any direction but parallel to the guides. A first drive screw hanger 62 is bolted to the first cross slide and is fixed to the precision screw 50. A second slide plate 63 is bolted to the first cross slide 52 and carries a pair of bevelled guides 64 at opposite sides of the plate extending perpendicularly to the longitudinal extent of guides 61. Guides 64 hold the second cross slide 46 against movement with respect to second slide plate 63 in any direction but parallel to the guides.

A second drive screw hanger 65 is attached to the end of precision screw 45 and bolted to a slide support 66 which is L-shaped and cooperates with the drive screw hanger to hold the second slide between them. The second slide carries guide 67 which holds the reticle 13 fixed with respect to the second slide.

The cross slide assembly, or reticle movement assembly operates in the following manner: when bevel gear 56 rotates to drive bevel pinion 55, the digitizer shaft 54 is rotated to rotate nut 51. Rotation of nut 51 causes lineal movement of precision screw 50 in a direction dependent upon the direction of rotation of the bevel gear 56. Cross slide 52 is moved with precision screw 50 in a direction parallel to guides 61. Since the second slide plate 63 is fixed to the first cross slide, it moves therewith, and since the second cross slide 46 and the reticle are fixed against movement with respect to the second cross slide in a direction parallel to guides 61, the reticle moves in the same direction as first cross slide 52. Digitizer 17 indicates or detects the extent of movement of the reticle in that direction.

When the bevel gear 41 rotates to drive bevel pinion 42 shaft 43 rotates to move the precision screw 45 in a direction parallel to guides 64. Second cross slide 46 is thereby caused to move in the same direction and to carry reticle 13 with it. Digitizer 16 detects the extent of movement of the reticle in the direction parallel to guides 64, a direction perpendicular to that in which the reticle moves when first cross slide 52 is moved.

It will be seen that slide plate 60 has a substantially square slot 70 extending through the central portion thereof and that slide 52 has a slot 71 of substantially the same width but elongated in the direction of its movement, registering with slot 70. Slide plate 63 has a slot 72 similar to slot 71 extending through it, and cross slide 46 has a slot 73 of larger dimensions in both perpendicular directions through it. Thereby, light from the source 10 passes through rear barrel 34, through the etched-out portions of the reticle, through slot 70 in slide plate 60, and through lens 38 on its way to half surface mirror 7. Pulley 74 of the lens assembly permits remote focussing of the reticle image.

The reticle is also caused to rotate about the optical axis of its projection system, by rotation of a worm gear 75 shown mounted fixedly on the rear barrel 34 of the drum assembly of Fig. 4. Since the first slide plate 60 is fixed with respect to worm gear 75, the reticle rotates with the gear. It will be appreciated that it is undesirable for such rotation to cause lineal movement of the reticle, rotation of the digitizer shafts, or movement of the controls which cause lineal movement of the reticle. The apparatus to be described prevents interaction of the rotational and lineal movements.

Referring to Fig. 7, spur gear 57 is rotated to move the reticle in one lineal direction by a spur gear 76 meshing therewith. Gear 76 is fixed to a sleeve which carries a bevel gear 77 which forms part of a differential 78. Differential 78 includes a second bevel gear 79 parallel to gear 77, both meshing with a spider bevel gear 80. The spider shaft 81 is rotatable with respect to all of said gears except the spider gear 80, which is keyed to it. A sprocket wheel 82 may be connected to a control handwheel by means of a roller chain drive (not shown).

Spider shaft 81 is coupled by flexible coupling 83 to the spider shaft 84 of a second differential 85 which is identical with differential 78, so that it need not be further described. Sprocket 86 rotates to cause rotation of the differential, which is transmitted to a spur gear 87 meshed with spur gear 40.

Rotation of the housing to rotate the reticle causes rotation of the differential shafts 81 and 84 at the same speed through a spur gear 90 fixed to worm gear 75 and a meshing spur gear 91 fixed to shaft 84. When sprockets 82 and 86 are stationary, then, spur gears 76 and 87 rotate with the housing at a 2:1 stepup because of the differential linkages. Gears 76 and 57 and 87 and 40 have a complementary 2:1 stepdown relationship, so that gears 57 and 40 rotate synchronously with the reticle housing. The result is that there is no rotation of either of sprocket wheels 82 and 86 and no rotation of either of digitizer bevels 42 and 55, when the housing is rotated.

Spider shafts 81 and 84 are mounted in bearings 92 and 93 in a base plate 94 which (Fig. 3) carries a bracket 95. The bracket supports a worm drive 96 which is indicated only in block form but which may be controlled by the operator to rotate the reticle to the elevation angle.

The worm drive rotates a shaft 97 which is rotatable in a bearing 98 in bearing block 99 fixed to the base plate. The shaft has a spur gear 100 fixed to it, which meshes with a spur gear 101 fixed to a worm shaft 102. Worm shaft 102 carries a worm 103 which meshes with worm gear 75 of the reticle housing. The worm shaft is mounted in bearings 104 and 105 which permit reciprocatory movement of the shaft to make small adjustments in the angular position of the reticle. A pulley 106 mechanically connected to shaft 102 permits remote adjustment of the reticle position in rotation.

In operation of the apparatus above described, the operator first makes certain that the cross-hairs 9 of the film frame image have their origin registering with the screen dot 24. He then operates the worm drive 96 to align the reticle image 15 with the angular position of the cross-hairs. With the isolation means described, no lineal translation of the reticle or rotation of the digitizer bevel gears results.

Next, the operator operates the handwheels to rotate the pulleys 82 and 86 and cause the reticle to move into position such that its scanning dot 15 registers with a selected point on the target 20. The digitizers 16 and 17 detect the bearing and elevation movements necessary for such positioning of the scanning dot. The bearing and elevation readings of the film frame may then be corrected in accordance with these bearing and elevation errors, by appropriate apparatus.

It will be evident that many changes could be made in the apparatus above described without departure from the scope of the invention. Specifically, another kind of differential than that described could be used. Accordingly, the invention is not to be considered limited to the embodiment described but only by the scope of the appended claims.

I claim:

1. In a reference projector for a photo-theodolite film reader of the type having a screen on which the film image and the reference are both optically projected, the combination of a rotatable housing defining a light path, said housing being mounted for rotation about an axis extending in the direction of said light path; first and second cross slides disposed in said housing; means mounting said first cross slide for movement in a first direction extending transversely of said light path; means mounting said second cross slide on said first cross slide for movement in a second direction extending transversely of said light path, said first and second directions being mutually perpendicular, said second cross slide being constrained to move with said first cross slide; a reticle mounted on one of said cross slides, the means mounting said cross slides being so constructed and arranged that said cross slides and said reticle rotate with said housing; a pair of precision screws and a pair of nuts each threadably engaged with a different one of said screws, one of said screws being fixed to said first cross slide and extending in said first direction, the other of said screws being fixed to said second cross slide and extending in said second direction, said nuts being rotatably mounted to actuate said screws but being fixed against movement in said first and second directions respectively; a first pair of gears each connected to a different one of said nuts to rotate the same; a second pair of gears each mounted on said housing for rotation with respect thereto about an axis extending in the direction of said light path, each gear of said second pair being operatively connected to a different gear of said first pair to rotate the same; control means arranged to rotate the gears of said second pair selectively and thereby selectively rotate said nuts to accomplish adjustment of said cross slides and therefore of said reticle; rotary adjusting means operatively connected to said housing to rotate the same, and compensating gear means operated by said rotary adjusting means and operatively connected to the gears of said second pair to cause the latter to rotate synchronously with said housing, whereby rotation of said nuts as a result of rotation of said housing is prevented.

2. Apparatus in accordance with claim 1 and wherein said control means comprises a pair of coupled differentials each having an input shaft and an output shaft, the output shaft of each differential carrying an output gear meshed with a different gear of said second pair, and said compensating gear means is connected to the output shaft of one of said differentials.

3. In a reference object projector for an optical comparator, the combination of a housing defining a light path and mounted for rotation about an axis extending in the direction of said light path; a reticle; a reticle mount disposed in and secured to said housing and carrying said reticle, said mount comprising a pair of cross slides disposed for movement in directions extending at right angles to each other and transversely with respect to said light path, said mount being so constructed that rotation of said housing and movements of said cross slides in said transversely extending directions all are effective to adjust the position of said reticle; a first gear mounted on said housing for rotation about the axis of rotation of the housing; first motion conversion means operatively connecting said first gear to one of said cross slides and effective to convert rotary motion of said first gear into linear motion of said one cross slide in its respective transversely extending direction of movement; a second gear mounted on said housing for rotation about the axis of rotation of the housing; second motion conversion means operatively connecting said second gear to the other of said cross slides and effective to convert rotary motion of said second gear into linear motion of said other cross slide in its respective transversely extending direction of movement; control means connected to said gears and constructed and arranged to selectively rotate said gears relative to said housing to selectively adjust said cross slides and therefore said reticle; rotary adjusting means operatively connected to said housing to rotate the same, said first and second motion conversion means each including a coupled pair of rotary elements, one of which is carried by said housing to rotate therewith, in such fashion that rotation of said housing would normally tend to cause said motion conversion means to adjust said cross slides even though said control means be not operated; and gear means arranged for actuation by rotation of said housing and connected to said first and second gears to rotate the same synchronously with said housing, thereby preventing rotation of the housing from causing transverse adjustment of said cross slides.

4. Apparatus in accordance with claim 3 wherein said first and second gears are bevel gears and each of said motion conversion means comprises a bevel pinion meshed with one of said first and second gears and mounted on said housing for rotation about an axis extending in the lateral direction of movement of one of said cross slides, a precision screw fixed to such cross slide and a nut threadably engaged with said screw and connected to said pinion for rotation thereby.

5. Apparatus in accordance with claim 3 and wherein said control means comprises a pair of differentials each having an input shaft and an output shaft, the output shaft of one differential being coupled to the input shaft of the other differential, and a pair of output gears each mounted for rotation by the output shaft of a different one of said differentials, one of said output gears being arranged to rotate said first gear and the other being arranged to rotate said second gear, and means for selectively rotating the input shafts of said differentials.

6. Apparatus in accordance with claim 5 and wherein the gear means arranged for actuation by rotation of said housing includes a gear fixed to said housing, to rotate therewith and a gear fixed to the output shaft of one of said differentials and operatively meshed with said last-mentioned gear.

7. In a reference object projector for an optical comparator, the combination of a housing defining a light path and mounted for rotation about an axis extending in the direction of said path; a reference object; a reference object mount disposed in and secured to said housing and carrying said reference object, said mount including a support member mounted for movement in a direction extending transversely with respect to said light path, said mount being so constructed that rotation of said housing and movement of said support member in said transversely extending direction are effective to adjust the position of said reference object; a ring member mounted on said housing for rotation relative to said housing about the axis of rotation of said housing; motion conversion means operatively connecting said ring member to said support member and effective to convert rotary motion of said ring member into linear movement of said support member in said transversely extending direction of movement; control means connected to said ring member and constructed and arranged to rotate said ring member relative to said housing to adjust said support member and thereby said reference object; rotary adjusting means operatively connected to said housing to rotate the same, said motion conversion means including a coupled pair of rotary elements, one of which is carried by said housing to rotate therewith in such fashion that rotation of said housing would normally tend to cause said motion conversion means to adjust said support member even though said control means be not operated, and rotary motion transfer means connected to said ring member and arranged for actuation by rotation of said housing to rotate said ring member synchronously with said housing, thereby preventing rotation of the housing from causing transverse adjustment of said support member.

References Cited in the file of this patent

UNITED STATES PATENTS

| | | |
|---|---|---|
| 1,891,052 | Ott | Dec. 13, 1932 |
| 2,155,248 | Adams | Apr. 18, 1939 |
| 2,616,177 | Bazhaw | Nov. 4, 1952 |